United States Patent
Ibe et al.

(10) Patent No.: US 7,098,906 B2
(45) Date of Patent: Aug. 29, 2006

(54) MAP DRAWING APPARATUS WITH AUDIO DRIVEN OBJECT ANIMATIONS

(75) Inventors: Yoshihito Ibe, Tokyo (JP); Kiyonori Myochin, Tokyo (JP); Sosuke Nishida, Saitama (JP)

(73) Assignee: Pioneer Corporation, Tokyo (JP)

( * ) Notice: Subject to any disclaimer, the term of this patent is extended or adjusted under 35 U.S.C. 154(b) by 199 days.

(21) Appl. No.: 10/254,640

(22) Filed: Sep. 26, 2002

(65) Prior Publication Data
US 2003/0063083 A1 Apr. 3, 2003

(30) Foreign Application Priority Data
Sep. 28, 2001 (JP) .................... P. 2001-301997

(51) Int. Cl.
*G06T 1/00* (2006.01)
*G06T 13/00* (2006.01)

(52) U.S. Cl. ..................... 345/418; 345/473
(58) Field of Classification Search ............... 345/419, 345/473, 956, 728, 764; 704/231, 235; 381/56; 340/815.75
See application file for complete search history.

(56) References Cited

U.S. PATENT DOCUMENTS

| | | | | |
|---|---|---|---|---|
| 3,978,287 A | * | 8/1976 | Fletcher et al. ............. 704/231 |
| 4,612,665 A | * | 9/1986 | Inami et al. .................. 381/98 |
| 5,602,564 A | * | 2/1997 | Iwamura et al. ............ 715/782 |
| 5,802,492 A | | 9/1998 | DeLorme et al. .......... 701/200 |
| 5,884,218 A | * | 3/1999 | Nimura et al. .............. 701/208 |
| 5,999,879 A | * | 12/1999 | Yano .......................... 701/208 |
| 6,023,290 A | * | 2/2000 | Seita .......................... 348/118 |
| 6,401,028 B1 | * | 6/2002 | Kamiya et al. ............. 701/200 |
| 6,401,035 B1 | * | 6/2002 | Jin ............................. 701/213 |
| 6,448,971 B1 | * | 9/2002 | Seefeldt et al. ............. 345/475 |
| 6,751,546 B1 | * | 6/2004 | Yamashita .................. 701/200 |
| 6,785,667 B1 | * | 8/2004 | Orbanes et al. ............... 707/1 |
| 2004/0104842 A1 | * | 6/2004 | Drury et al. ........... 342/357.13 |

FOREIGN PATENT DOCUMENTS

| | | |
|---|---|---|
| EP | 0 740 132 A2 | 10/1996 |
| EP | 1 003 017 A2 | 5/2000 |
| EP | 1 267 314 A2 | 12/2002 |
| JP | 2000350219 | * 12/2000 |

* cited by examiner

*Primary Examiner*—Kee M. Tung
*Assistant Examiner*—Daniel F. Hajnik
(74) *Attorney, Agent, or Firm*—Drinker Biddle & Reath LLP (57) ABSTRACT

A map drawing apparatus has a map information reading section, a level extracting section, and a map information processing section. The map information reading section reads map information. The level extracting section extracts a level of a spectrum over a predetermined frequency range from a signal of input sound. The map information processing section processes the form (height, color, shape) of an object (a building, a cloud in the background, or the like) contained in the map information read by the map information reading section, into map information dynamically changed in cooperation with the spectrum extracted by the level extracting section. The map information processing section converts the processed map information into an image signal that can be displayed on a display device.

12 Claims, 10 Drawing Sheets

| WIDE-RANGE INFORMATION CODE | WIDE-RANGE INFORMATION |
|---|---|
| 001 | DRAWING METHODS ARE LATERALLY DIFFERENT ACROSS ROAD |
| 002 | DRAWING METHODS ARE VERTICALLY DIFFERENT ACROSS CENTER HORIZONTAL LINE IN SCREEN |
| ⋮ | ⋮ |
| 010 | BUILDING IS MADE HIGHER AS NEARER TO ROAD |
| 011 | BUILDING IS MADE HIGHER AS NEARER TO LOWER PORTION OF SCREEN |
| ⋮ | ⋮ |
| 020 | COLOR OF BUILDING IS MADE DEEPER AS NEARER TO ROAD |
| 021 | COLOR OF BUILDING IS MADE DEEPER AS NEARER TO LOWER PORTION OF SCREEN |
| ⋮ | ⋮ |

FIG. 4

| SELECTION METHOD CODE | SELECTION METHOD |
|---|---|
| 001 | SELECT BY FIXED SELECTION METHOD A |
| 002 | SELECT BY FIXED SELECTION METHOD B |
| ⋮ | ⋮ |
| 010 | SELECT BY RANDOM SELECTION METHOD A |
| 011 | SELECT BY RANDOM SELECTION METHOD B |
| ⋮ | ⋮ |
| 020 | SELECT WHILE SWITCHING OVER FIXED SELECTION METHODS A AND B EVERY 5 SECONDS |
| 021 | ALLOCATE WHILE SWITCHING OVER FIXED SELECTION METHODS A AND RANDOM SELECTION METHOD A EVERY 5 SECONDS |
| 022 | ALLOCATE WHILE SWITCHING OVER FIXED SELECTION METHODS A AND RANDOM SELECTION METHOD B EVERY 5 SECONDS |
| 023 | ALLOCATE WHILE SWITCHING OVER RANDOM SELECTION METHODS A AND B EVERY 5 SECONDS |
| ⋮ | ⋮ |
| 030 | ALLOCATE WHILE SWITCHING OVER FIXED SELECTION METHODS A AND B EVERY 10 SECONDS |
| 031 | ALLOCATE WHILE SWITCHING OVER FIXED SELECTION METHODS A AND RANDOM SELECTION METHOD A EVERY 10 SECONDS |
| 032 | ALLOCATE WHILE SWITCHING OVER FIXED SELECTION METHODS A AND RANDOM SELECTION METHOD B EVERY 10 SECONDS |
| 033 | ALLOCATE WHILE SWITCHING OVER RANDOM SELECTION METHODS A AND B EVERY 10 SECONDS |
| ⋮ | ⋮ |

FIG. 5

| DRAWING METHOD CODE | DRAWING METHOD |
|---|---|
| 0001 | CHANGE HEIGHT OF BUILDING IN ACCORDANCE WITH LEVEL OF FULL-FREQUENCY RANGE COMPONENT |
| 0002 | CHANGE HEIGHT OF WALL FACE IMAGE OF BUILDING IN ACCORDANCE WITH LEVEL OF FULL-FREQUENCY RANGE COMPONENT |
| 0003 | CHANGE COLOR OF WALL FACE IMAGE OF BUILDING IN ACCORDANCE WITH LEVEL OF FULL-FREQUENCY RANGE COMPONENT |
| 0004 | CHANGE COLOR OF BUILDING IN ACCORDANCE WITH LEVEL OF FULL-FREQUENCY RANGE COMPONENT |
| 0005 | CHANGE SHAPE OF BUILDING IN ACCORDANCE WITH LEVEL OF FULL-FREQUENCY RANGE COMPONENT |
| 0006 | CHANGE SHAPE OF WALL FACE IMAGE OF BUILDING IN ACCORDANCE WITH LEVEL OF FULL-FREQUENCY RANGE COMPONENT |
| 0007 | CHANGE HEIGHT OF BUILDING IN ACCORDANCE WITH LEVEL OF HIGH-FREQUENCY RANGE COMPONENT |
| 0008 | CHANGE HEIGHT OF WALL FACE IMAGE OF BUILDING IN ACCORDANCE WITH LEVEL OF HIGH-FREQUENCY RANGE COMPONENT |
| 0009 | CHANGE COLOR OF BUILDING IN ACCORDANCE WITH LEVEL OF HIGH-FREQUENCY RANGE COMPONENT |
| 0010 | CHANGE COLOR OF WALL FACE IMAGE OF BUILDING IN ACCORDANCE WITH LEVEL OF HIGH-FREQUENCY RANGE COMPONENT |
| 0011 | CHANGE SHAPE OF BUILDING IN ACCORDANCE WITH LEVEL OF HIGH-FREQUENCY RANGE COMPONENT |
| 0012 | CHANGE SHAPE OF WALL FACE IMAGE OF BUILDING IN ACCORDANCE WITH LEVEL OF HIGH-FREQUENCY RANGE COMPONENT |
| 0013 | CHANGE HEIGHT OF BUILDING IN ACCORDANCE WITH LEVEL OF LOW-FREQUENCY RANGE COMPONENT |
| ⋮ | ⋮ |
| 0020 | SUPERIMPOSEDLY DISPLAY GRAPHIC EQUALIZER IN BACKGROUND |
| 0021 | INSERT ANIMATION INTO BACKGROUND |
| ⋮ | ⋮ |
| 0030 | DISPLAY BUILDING IN FORM OF WIRE FRAME |
| 0031 | DISPLAY BUILDING IN FORM OF POLYGON |
| ⋮ | ⋮ |
| 0040 | USE LEVEL EXTRACTED FROM L-CHANNEL OF MUSIC DATA |
| 0041 | USE LEVEL EXTRACTED FROM R-CHANNEL OF MUSIC DATA |
| 0042 | USER LEVEL EXTRACTED FROM L- AND R-CHANNELS OF MUSIC DATA |
| ⋮ | ⋮ |

| ALLOCATION METHOD CODE | ALLOCATION METHOD |
|---|---|
| 001 | CYCLICALLY ALLOCATE IN FIXED ALLOCATION PATTERN A |
| 002 | CYCLICALLY ALLOCATE IN FIXED ALLOCATION PATTERN B |
| ⋮ | ⋮ |
| 010 | ALLOCATE IN RANDOM PATTERN A |
| 011 | ALLOCATE IN RANDOM PATTERN B |
| ⋮ | ⋮ |
| 021 | ALLOCATE WHILE SWITCHING OVER FIXED ALLOCATION PATTERN A AND B EVERY 5 SECONDS |
| 022 | ALLOCATE WHILE SWITCHING OVER FIXED ALLOCATION PATTERN A AND RANDOM ALLOCATION PATTERN A EVERY 5 SECONDS |
| 023 | ALLOCATE WHILE SWITCHING OVER FIXED ALLOCATION PATTERN A AND RANDOM ALLOCATION PATTERN B EVERY 5 SECONDS |
| 024 | ALLOCATE WHILE SWITCHING OVER RANDOM ALLOCATION PATTERNS A AND B EVERY 5 SECONDS |
| ⋮ | ⋮ |
| 030 | ALLOCATE WHILE SWITCHING OVER FIXED ALLOCATION PATTERNS A AND B EVERY 10 SECONDS |
| 031 | ALLOCATE WHILE SWITCHING OVER FIXED ALLOCATION PATTERN A AND RANDOM ALLOCATION PATTERN A EVERY 10 SECONDS |
| 032 | ALLOCATE WHILE SWITCHING OVER FIXED ALLOCATION PATTERN A AND RANDOM ALLOCATION PATTERN B EVERY 10 SECONDS |
| 033 | ALLOCATE WHILE SWITCHING OVER RANDOM ALLOCATION PATTERNS A AND B EVERY 10 SECONDS |
| ⋮ | ⋮ |

MAP DRAWING APPARATUS WITH AUDIO DRIVEN OBJECT ANIMATIONS

The present disclosure relates to the subject matter contained in Japanese Patent Application No. 2001-301997 filed on Sep. 28, 2001, which are incorporated herein by reference in its entirety.

BACKGROUND OF THE INVENTION

1. Field of the Invention

The present invention relates to a map drawing apparatus, and more particularly to a map drawing apparatus that is suitable for drawing map information for a vehicle navigation apparatus, which displays GPS (Global Positioning System) information (positional information of a vehicle) and map information of the vicinity of the own vehicle, on a display device.

2. Description of the Related Art

As electronic apparatuses mounted on a motor vehicle, an audio apparatus, and a vehicle navigation apparatus, which displays GPS information and map information of the vicinity of the own vehicle on a display device mounted on the vehicle have come into widespread use. In accordance with increase of the capacity of a storage device incorporated in such a navigation system, recently, a usage mode has been proposed in which music data and map data are stored on the same storage medium, and a navigation system is connected to an audio apparatus to reproduce music. Also an apparatus in which a vehicle audio apparatus and a navigation system are integrated with each other has been developed.

In this way, integration of a vehicle audio apparatus and a vehicle navigation system is advancing. However, music is reproduced by a vehicle audio apparatus in no cooperation with contents displayed on a screen of a vehicle navigation apparatus. Even when music is reproduced in the cabin by the vehicle audio apparatus, the vehicle navigation apparatus remains to display uniform map information. A display device constituting the vehicle navigation apparatus is placed in a position at which the driver can easily look. In order to relieve the tedium of driving, it is requested to effectively use both the music played in the cabin and the display device to provide the display form with an entertaining element.

SUMMARY OF THE INVENTION

The invention has been conducted in view of the above-mentioned circumstances. It is an object of the invention to provide a map drawing apparatus in which a novel function of cooperating with a sound is added to the display form of a display device, so that the apparatus is provided with an entertaining element.

According to a first aspect of the invention, there is porovided a map drawing apparatus has a map information reading section (a map information reading section 11) which reads map information; a level extracting section (a level extracting section 12) which extracts a level of a spectrum over a predetermined frequency range from a signal of an input sound; a map information processing section (a map information processing section 13) which processes a form (height, color, shape) of an object (an object contained in the map information, i.e., a symbol data such as a building or a cloud in the background which is a shape data in the map information) contained in the map information read by the map information reading section, into map information that is dynamically changed in cooperation with the spectrum extracted by the level extracting section, and which converts the processed map information into a image signal that can be displayed on a display device.

According to the first aspect of the invention, the form of an object contained in the map information is dynamically changed in cooperation with a spectrum of music data of a vehicle audio apparatus, music data which are stored together with map data in a main unit of a navigation apparatus, a music signal supplied from a sound source which stores external music data downloaded through a network, a voice which is input via a microphone, a signal of a music played in the cabin. Therefore, the display form can be provided with a novel function of cooperating with a sound, so that the map drawing apparatus is provided with an entertaining element.

According to a second aspect of the invention, the map information processing section allocates divisions of the map information to spectra of left and right channels of the input sound. According to the second aspect of the invention, spectra of left and right channels of the input sound are used, and the left and right channels are allocated to divisions of the map information, respectively, whereby motions of the object displayed on a screen can be expressed for each of the left and right channels of the input sound.

According to third and fourth aspects of the invention, the divisions of the map information are two display regions that are separated across a road on which an own vehicle is travelling, the left channel of the input sound is allocated to one of the display regions, and the right channel of the input sound is allocated to another one of the display regions. In the map drawing apparatus of the invention, the divisions of the map information are display regions which are obtained by dividing a display screen of the display device, and which are used for displaying plural kinds of map information, the left channel of the input sound is allocated to one of the display regions, and the right channel of the input sound is allocated to another one of the display regions.

According to the third and fourth aspects of the invention, when motions of the object displayed on a screen are to be expressed for each of the left and right channels of the input sound, the left and right channels are allocated with using the road on which the own vehicle is travelling, as the center, or, in the case where the screen is divided, allocation is performed in, the unit of screen, whereby motions of the object can be made different from each other with respect to a certain position on the screen. As a result, motions of the object are uniformalized for each of the regions, so that motions can be expressed without causing a visual sense of discomfort.

According to a fifth aspect of the invention, the map information processing section allocates divisions of the map information to spectra of high- and low-frequency ranges of the input sound. According to the fifth aspect of the invention, the spectra of high- and low-frequency ranges of the input sound are used, and the spectra are allocated to the divisions of the map information, whereby motions of the object displayed on the screen can be expressed for each of components of the input sound.

According to six and seventh aspects of the invention, the divisions of the map information are a region in which a side close to a road on which an own vehicle is travelling is displayed, and a region in which a side remote from the road is displayed, the high-frequency range of the input sound is allocated to one of the display regions, and the low-frequency range of the input sound is allocated to another one of the display regions.

In the map drawing apparatus of the invention, the divisions of the map information are a region in which a distant view of a displayed map is displayed, and a region in which a close view of the map is displayed, the high-frequency range of the input sound is allocated to one of the display regions, and the low-frequency range of the input sound is allocated to another one of the display regions.

According to the sixth and seventh aspects of the invention, when motions of the object displayed on the screen are to be expressed for each of components of the input sound, the components of the sound are allocated in accordance with the distance from the road on which the own vehicle is travelling, or for each of distant and close views of the displayed map, whereby motions of the object can be made different from each other with respect to a certain position on the screen. As a result, motions of the object are uniformalized for each of the regions, so that motions can be expressed without causing a visual sense of discomfort.

According to an eighth aspect of the invention, the object is displayed in the form of a wire frame image. According to the eighth aspect of the invention, even in an urban district where objects crowd, the display in the form of a wire frame image allows motions of individual objects to be clearly expressed.

According to a ninth aspect of the invention, a graphic equalizer is superimposedly displayed in a null display region of a background. According to the ninth aspect of the invention, since a graphic equalizer is displayed, the apparatus is provided with not only an entertaining element but also a practical function.

BRIEF DESCRIPTION OF THE DRAWINGS

FIG. 5 shows a code table which exemplarily shows in a corresponding manner drawing methods by which the map drawing apparatus of the embodiment of the invention processes the map information for each of the divisions, and drawing method codes.

DETAILED DESCRIPTION OF THE PREFERRED EMBODIMENTS

Hereinafter, an embodiment of the invention will be described with reference to the accompanying drawings.

Figure 1:
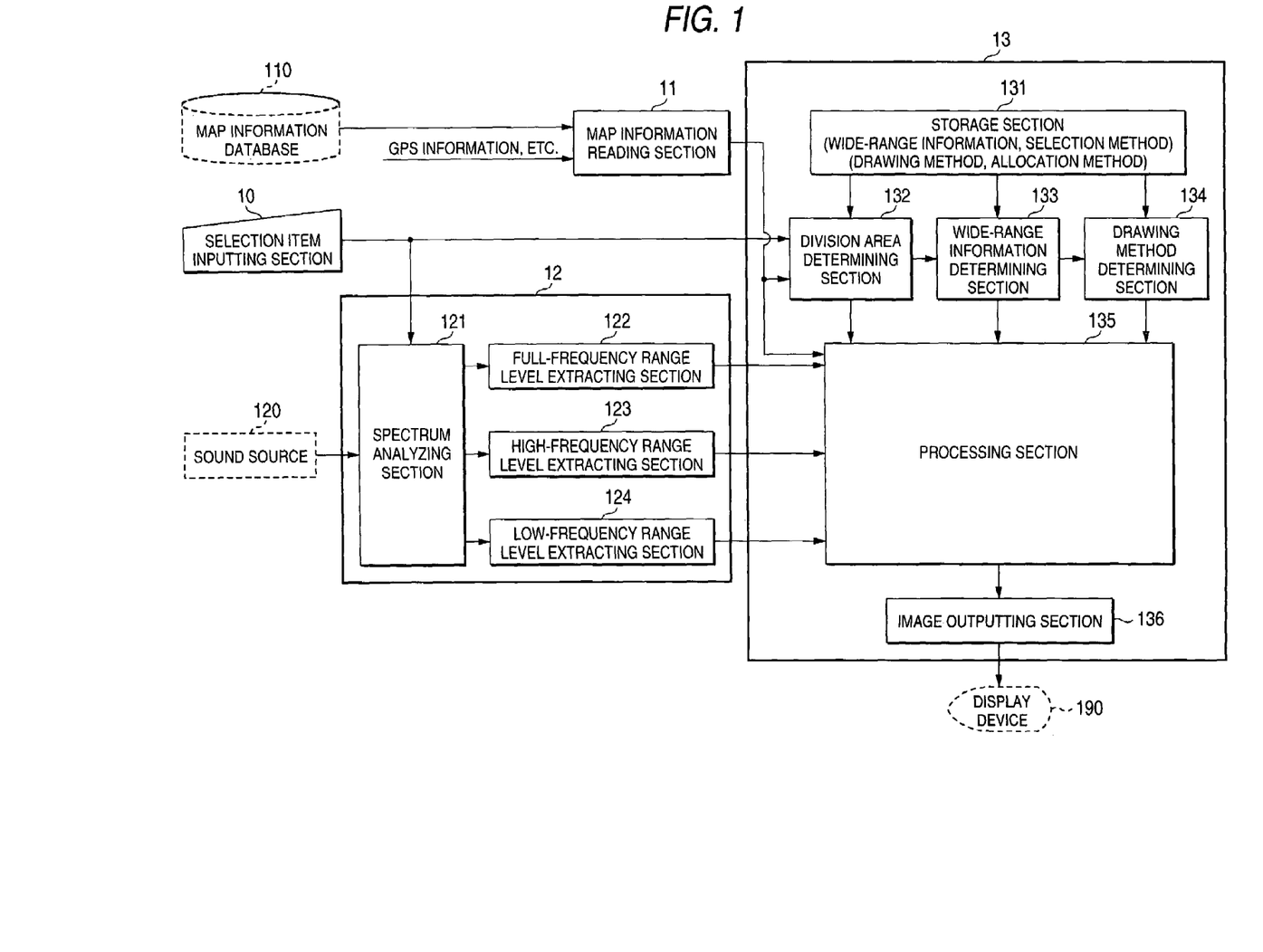
FIG. 1 is a block diagram showing the whole configuration of a map drawing apparatus which is an embodiment of the invention.

FIG. 1 is a block diagram showing the whole configuration of a map drawing apparatus according to an embodiment of the invention. The map drawing apparatus according to the present embodiment of the invention has a selection item inputting section 10, a map information reading section 11, a level extracting section 12, and a map information processing section 13. An selection item such as a mode is inputted from the selection item inputting section 10. The map information reading section 11 reads map information from a map information database 110, which is an external system. The level extracting section 12 analyzes spectrum components of a sound signal supplied from a sound source 120, which is an external system, to extract the average level. The map information processing section 13 processes the map information on the basis of an average level of the spectrum components of the sound and supplies the processed information as a image signal to a display device 190, which is an external system.

The level extracting section 12 has a spectrum analyzing section 121, a full-frequency range level extracting section 122, a high-frequency range level extracting section 123, and a low-frequency range level extracting section 124. The spectrum analyzing section 121 analyzes spectrum components of the sound signal supplied from the sound source 120. The full-frequency range level-extracting section 122 outputs spectrum components over the full frequency range of the sound. The high-frequency range level extracting section 123 outputs spectrum components of the high-frequency range only. The low-frequency range level extracting section 124 outputs spectrum components of the low-frequency range only.

The map information processing section 13 has a storage section 131, a division area determining section 132, a wide-range information determining section 133, a drawing method determining section 134, a processing section 135, and a image outputting section 136. The storage section 131 stores processing methods and the like. The division area determining section 132 divides an image region into divisions of a constant area. The wide-range information determining section 133 determines a processing method over a wide range of the screen. The drawing method determining section 134 determines a processing method for each of the divisions. The processing section 135 processes map information in consideration of all information. The image outputting section 136 outputs the processed map information as an image signal, The map information processing section 13 may be realized by a computer, which is program-controlled.

The map information database 110, the sound source 120, and the display device 190, which are external systems, may be realized by devices, which are used in an existing vehicle navigation system. Alternatively, they may be configured as elements constituting the embodiment.

The map information reading section 11, which is an element constituting the map drawing apparatus of the embodiment, may be realized by a device, which is used in an existing vehicle navigation system. The reading section may use a map database incorporated into the navigation system itself, or may obtain map information through a network from a map database accumulated in an external database.

The sound source 120 may be realized by a sound source, which is used in an existing vehicle audio apparatus, or may use a music database incorporated into the navigation system itself. As an input sound, music played in the car, or a voice may be used via a microphone.

Figure 2:
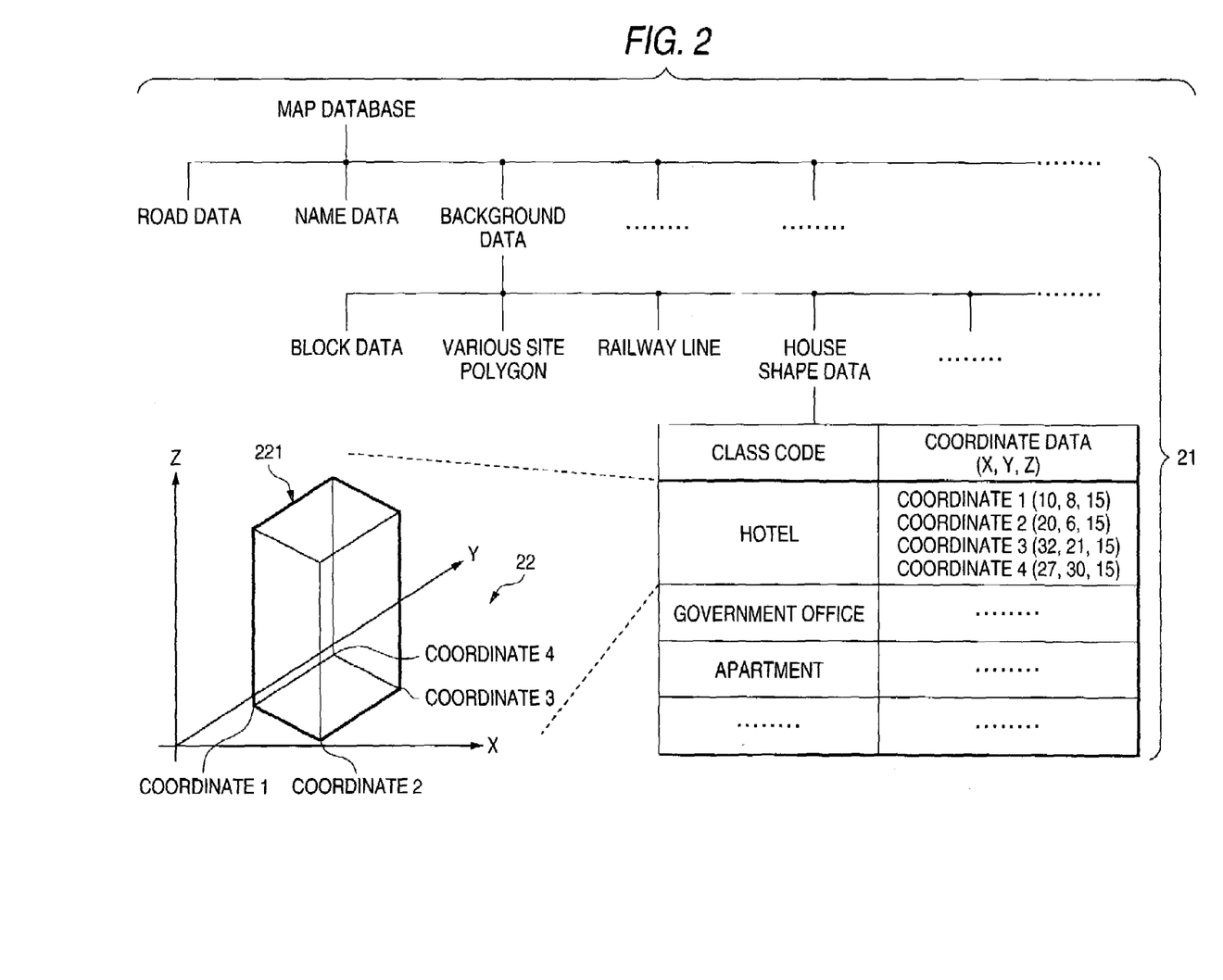
FIG. 2 is a diagram showing a configuration example of map information in a map information database which is supplied to the map drawing apparatus of the embodiment of the invention.

FIG. 2 is a diagram showing a configuration example of map information in the map information database, which is supplied to the map drawing apparatus according to the embodiment of the invention. As shown in the figure, map information 21, in the map information database 110 has a tree structure corresponding to a conceptual configuration of object data, which are to be displayed in a map. A table, which shows corresponding relationships between buildings and coordinates in the display screen for each of buildings, is disposed as object data in the lowest hierarchy level. FIG. 2 exemplarily shows correspondence relationships between coordinate data described in an entry of the table corresponding to a hotel 221 and coordinates in the display screen of the structure (the hotel 221), which is displayed as a corresponding image 22 on the display device 190 on the basis of the coordinate data. Objects to be displayed are not restricted to buildings and may include clouds in the background.

The coordinates of the object (structure: the hotel 221) shown in the table of FIG. 2 show only a very small part of the coordinates of the object. In practice, more detailed coordinates including coordinates in the height direction are described.

Hereinafter, the operation of the map drawing apparatus of the embodiment will be described with reference to FIGS. 1 to 8. The map information reading section 11 refers to CPS information or the like to read map information in the vicinity of the own vehicle from the map information database 110 and transmits the map information to the map information processing section 13.

The level extracting section 12 analyzes spectrum of a signal of sound (including various kinds of sounds and voices) supplied from the sound source 120 by using the spectrum analyzing section 121. In the spectrum analysis, the spectrum is analyzed by using a time interval, which is selectively input through the selection item inputting section 10, i.e., by using the time interval as one analysis unit. In addition to the spectrum of all the frequency components, also the spectrum of only the high-frequency range and that of only the low-frequency range are analyzed.

The spectrum shows the levels of harmonic components with respect to the fundamental wave, and is expressed in a form of a graph in which the abscissa indicates the frequency of the sound and the ordinate indicates the level of the sound. Single tone other than an obtuse sound (sinusoidal sound) includes the fundamental wave defining the pitch of the sound and a harmonic group defining mainly the tone. The harmonic component is sound of a frequency, which is an integer multiple of the frequency of the fundamental wave. Specifically, there are harmonic components of substantially infinity kinds ranging from the second harmonic of a frequency, which is twice the frequency of the fundamental wave, and the third harmonic of a frequency, which is thrice the frequency of the fundamental wave, to a harmonic of-several ten-order of a frequency, which is several tens times the frequency of the fundamental wave.

The full-frequency range level extracting section 122 calculates the spectrum of the full frequency range during the time interval from a result of the spectrum analysis over the full frequency range in the spectrum analyzing section 121 and sends a result of the calculation to the map information processing section 13. The high-frequency range level extracting section 123 calculates the spectrum of the high-frequency range during the time interval from a result of the spectrum analysis over only the high-frequency range in the spectrum analyzing section 121 and sends a result of the calculation to the map information processing section 13, The low-frequency range level extracting section 124 calculates the spectrum of the low-frequency range during the time interval from a result of the spectrum analysis over only the low-frequency range in the spectrum analyzing section 121 and sends a result of the calculation to the map information processing section 13.

Figure 3:
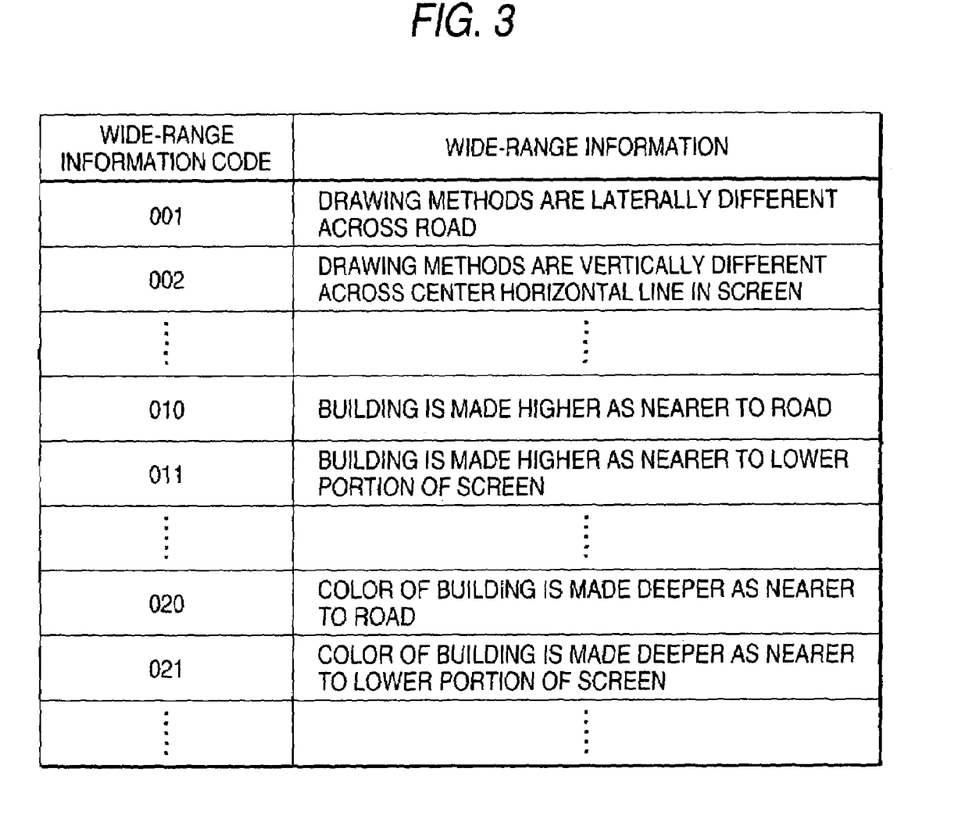
FIG. 3 shows a code table which exemplarily shows in a corresponding manner wide-range information that is used in a wide-range process of map information by the map drawing apparatus of the embodiment of the invention, and wide-range information codes.
Figure 4:
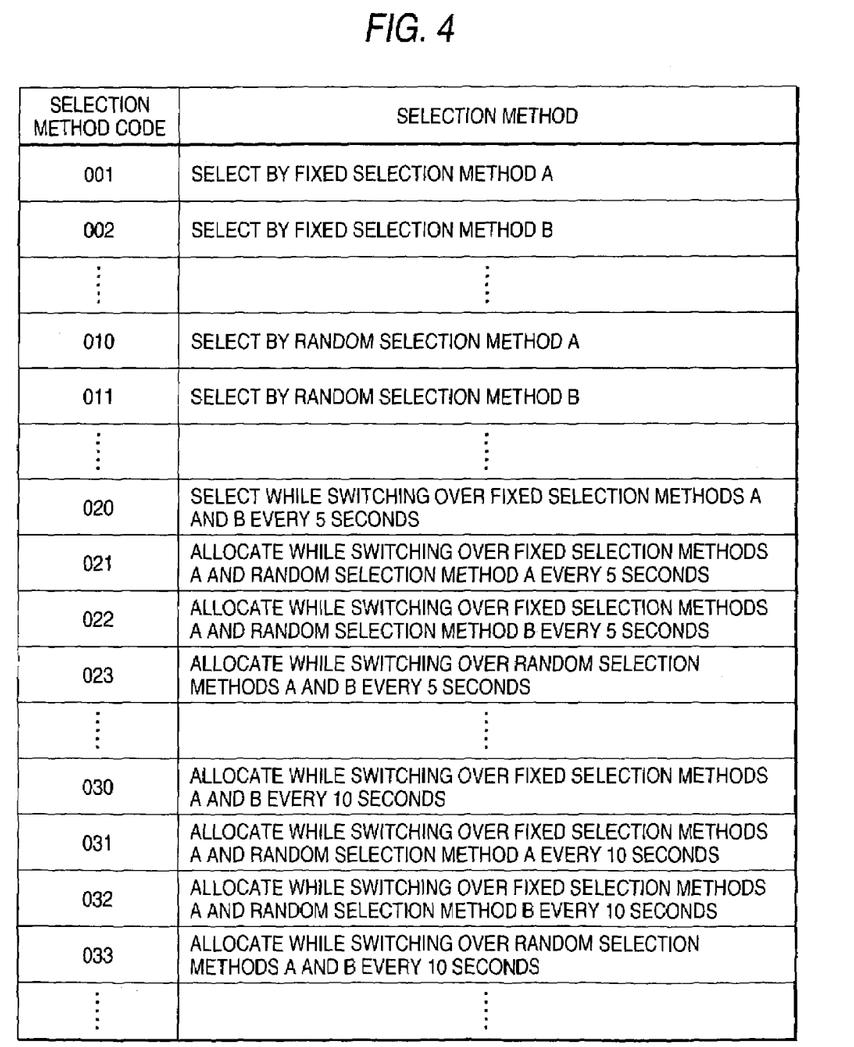
FIG. 4 shows a code table which exemplarily shows in a corresponding manner methods of selecting wide-range information that is used in a wide-range process of map information by the map drawing apparatus of the embodiment of the invention, and selection method codes.

The storage section 131 of the map information processing section,13 stores a code table in which wide-range information and selection methods, which are exemplified in FIGS. 3 and 4, are described and another code table in which drawing methods and methods of allocating the drawing methods to divisions are described. These methods exemplified in FIGS. 5 and 7.

In the map information processing section 13, each time when the selective-input through the selection item inputting section 10 is conducted, the division area determining section 132 determines the area of a division, which functions as an allocation unit of the display method on the display screen, the wide-range information determining section 133 determines a wide-range information code, which designates a wide-range display method on the display screen, and the drawing method determining section 134 determines the drawing method code, which designates the allocation method for each of the divisions.

If, at the timing of performing these determinations (when a predetermined time period has elapsed after the power on, or when one of the selection input items from the selection item inputting section 10 is changed), an item required for performing one of the determinations has not yet selectively input from the selection item inputting section 10, the map information processing section 13 can set a predetermined initial value (default value) as the item.

Figure 6:
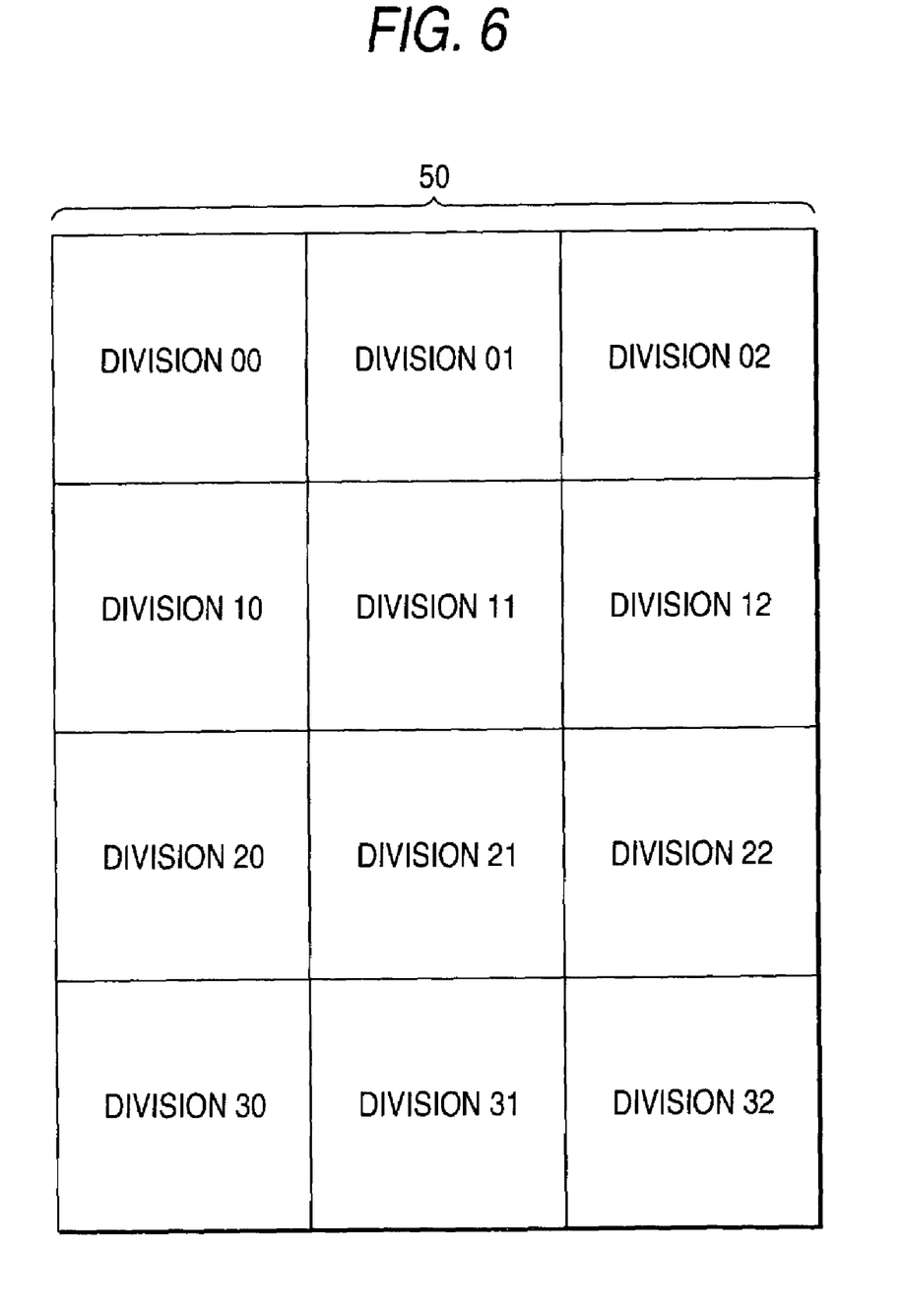
FIG. 6 shows a region map showing examples of divisions allocated to the display screen.

FIG. 6 shows a region map showing examples of divisions allocated to the display screen. In FIG. 6, divisions 00 to 32 are allocated to a screen region 50. First, the division area determining section 132 determines the division, which is exemplified in FIG. 6, on the display screen in consideration of the selection input by the operator through the selection item inputting section 10 and the map information from the map information reading section 11. In this case, the selection items, which can be selected through the selection item inputting section 10, may include "rough change", "fine change", and "arbitrary change".

FIG. 3 shows a code table, which exemplarily shows, in a corresponding manner, wide-range information used in a wide-range process of map information by the map drawing apparatus according to the embodiment of the invention and wide-range information codes. As shown in the figure, for example, code "001" shows a division that is centered at the road on which the own vehicle is travelling, code "002" shows a division in the case where the display screen of the display device is divided and plural sets of map information are displayed, codes "010" and "020" show divisions that display a region close to or remote from the road on which the own vehicle is travelling, and codes "011" and "021" show divisions that display a distant or close view region of a displayed map (in the case where the lower portion of the screen is used as a close view region).

FIG. 4 shows a code table, which exemplarily shows, in a corresponding manner, methods of selecting wide-range information used in a wide-range process of map information by the map drawing apparatus according to the embodiment of the invention and selection method codes. After the division area determining section 132 determines the division, the wide-range information determining section 133 reads the code tables, which are exemplarily shown in FIGS. 3 and 4 and in which the wide-range information and the selection method are described, and determines a wide-range information code, which designates the wide-range allocating method of the display screen in consideration of the selection input by the operator through the selection item inputting section 10, and the map information from the map information reading section 11.

In this case, the selection item input by the operator through the selection item inputting section 10 corresponds to the wide-range information code shown in FIG. 3, and the selection method code shown in FIG. 4. The correspondence relationships are not always requested to have a one-to-one correspondence. The wide-range information code shown in FIG. 3, and the selection method code shown in FIG. 4 may be set to be adequately bundled.

FIG. 5 shows a code table, which exemplarily shows, in a corresponding manner, drawing methods by which the map drawing apparatus according to the embodiment of the invention processes the map information for each of the divisions and the drawing method codes. Codes "0001" to "0019" are used for changing the form (height, color, and shape) of an object, which is a building, on the basis of the level of a spectrum of an input sound. In the codes, "0001" to "0006" are based on the spectrum of the full-frequency range of the sound, "0007" to "0012" are based on that of the high-frequency range of the sound, and "0013" to "0019" are based on that of the low-frequency range of the sound.

The height of the building is changed in a display form similar to a so-called graphic equalizer. The height of the wall face image of the building is changed in a display form in which the wall face showing window frames and the like is changed in the height direction while the height of the building is unchanged. The color of the wall face image of the building is changed in a display form in which the color of the drawn wall face showing window frames is changed while the height of the building is unchanged. The color of the building is changed in a display form in which the color of the building itself is changed while the height of the building is unchanged.

As other display forms, there are forms in which a graphic equalizer is superimposedly displayed in a vacant display region of the background ("0020"), in which an animation image is inserted into the background ("0021"), in which the structure is displayed in the form of a wire frame image ("0030"), and in which the structure is displayed in the form of a polygon ("0031").

In a further display form, the levels of spectra respectively extracted from left and right channels of the sound signal are used ("0040", "0041", and "0042").

Figure 7:
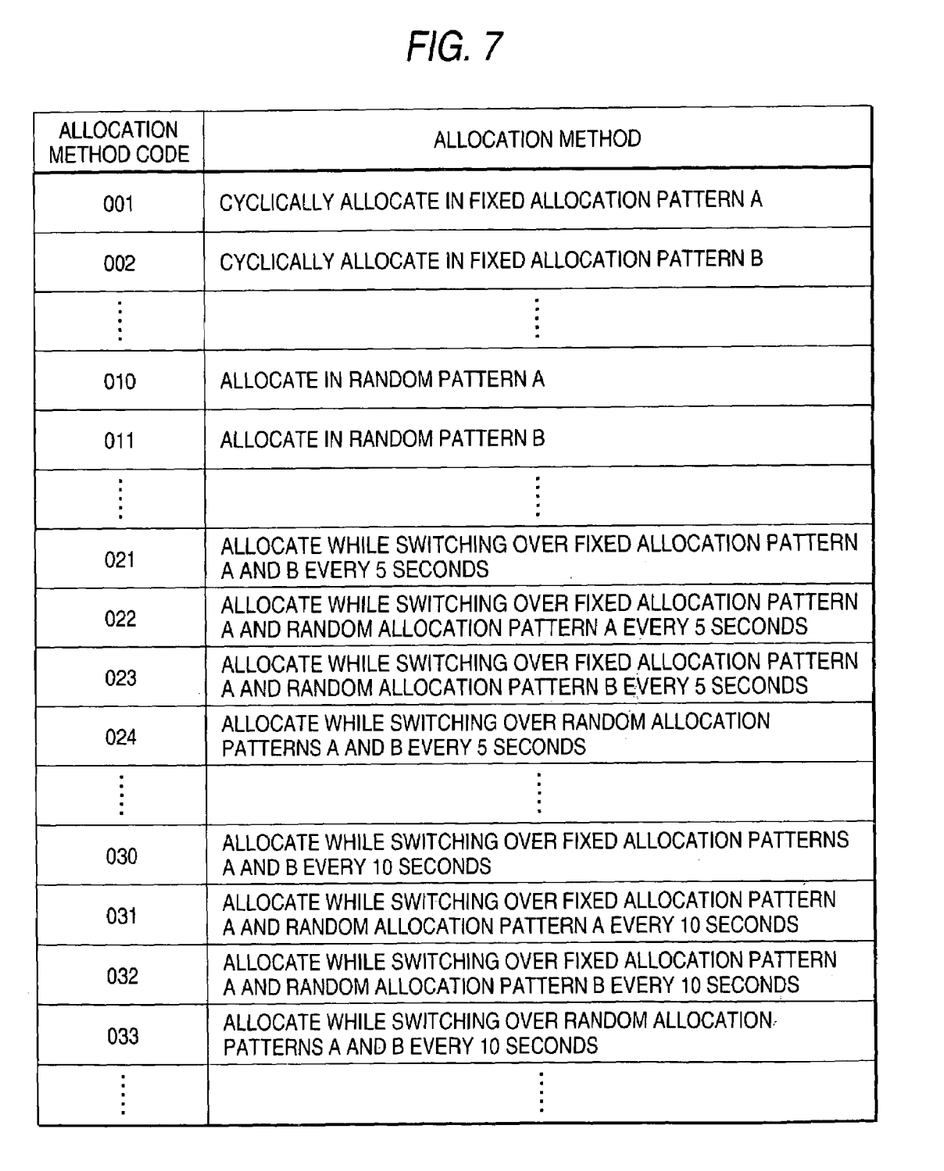
FIG. 7 shows a code table which exemplarily shows in a corresponding manner methods of allocating drawing methods that are used in a process of map information for each of divisions by the map drawing apparatus of the embodiment of the invention, to divisions, and allocation method codes.

FIG. 7 shows a code table, which exemplarily shows, in a corresponding manner, methods of allocating drawing methods, which are used in a process of map information for each of divisions by the map drawing apparatus according to the embodiment of the invention, to divisions, and allocation method codes.

After the division area determining section 132 determines the division, the drawing method determining section 134 reads the code tables, which describes the drawing methods and the methods of allocating the drawing methods to divisions as shown in FIGS. 5 and 7, respectively. Then, in consideration of the selection input by the operator through the selection item inputting section 10 and the map information from the map information reading section 11, the drawing method determining section 134 allocates, to each of the divisions determined by the division area determining section 132, drawing method codes indicating specific drawing methods (methods of processing the map information), which are applied to the divisions.

In this case, the selection item input by the operator through the selection item inputting section 10 corresponds to the drawing method code shown in FIG. 5 and the allocation method code shown in FIG. 7. The correspondence relationships are not always requested to have a one-to-one correspondence. The drawing method code shown in FIG. 5 and the allocation method code shown in FIG. 7 may be set to be adequately bundled.

Figure 8:
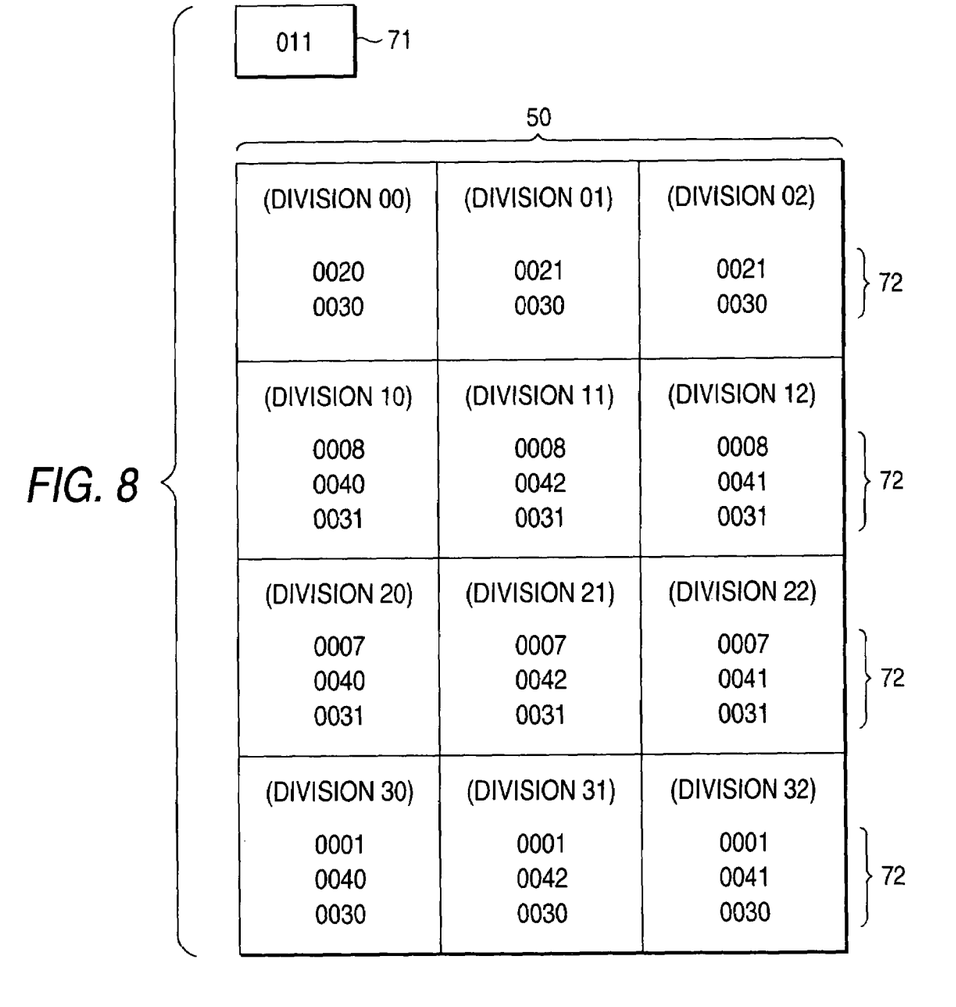
FIG. 8 is a diagram showing an example of a wide-range information code selected by a wide-range information determining section, and examples of drawing method codes allocated to divisions of the display screen by a drawing method determining section.

FIG. 8 is a diagram showing an example of the wide-range information code selected by the wide-range information determining section 133 and examples of the drawing method codes allocated to the divisions of the display screen by the drawing method determining section 134. In FIG. 8, the wide-range information determining section 133 of the map drawing apparatus selects a wide-range information code of "011", which is denoted by a selected wide-range information code 71. The drawing method determining section 134 allocates codes, which are denoted by an allocated drawing method code 72, that is, ranging from "0020, 0030" of division 00 to "0001, 0041, 0030" of division 32.

On the basis of information of the full-frequency range level extracting section 122, the high-frequency range level extracting section 123, and the low-frequency range level extracting section 124 of the level extracting section 12, the processing section 135 performs a wide-range process on the map information supplied from the map information reading section 11. The process performed by the processing section 135 corresponds to a wide-range code determined by the wide-range information determining section 133.

For each of the divisions determined by the division area determining section 132, the processing section 135 determines an object positioned in the division on the display screen. Then the division area determining section 132 performs a local process according to the drawing method indicated by the drawing method code, which is allocated by the drawing method determining section 134, on the map information corresponding to the determined object.

For an object extending plural divisions, the processing section 135 can determine the center line of the object and determine a division through which the center line passes as the division where the object is positioned.

The image outputting section 136 converts the map information, which has been processed by the processing section 135, into an image signal, and then outputs the image signal. This output can be displayed on the display device 190.

Figure 9:
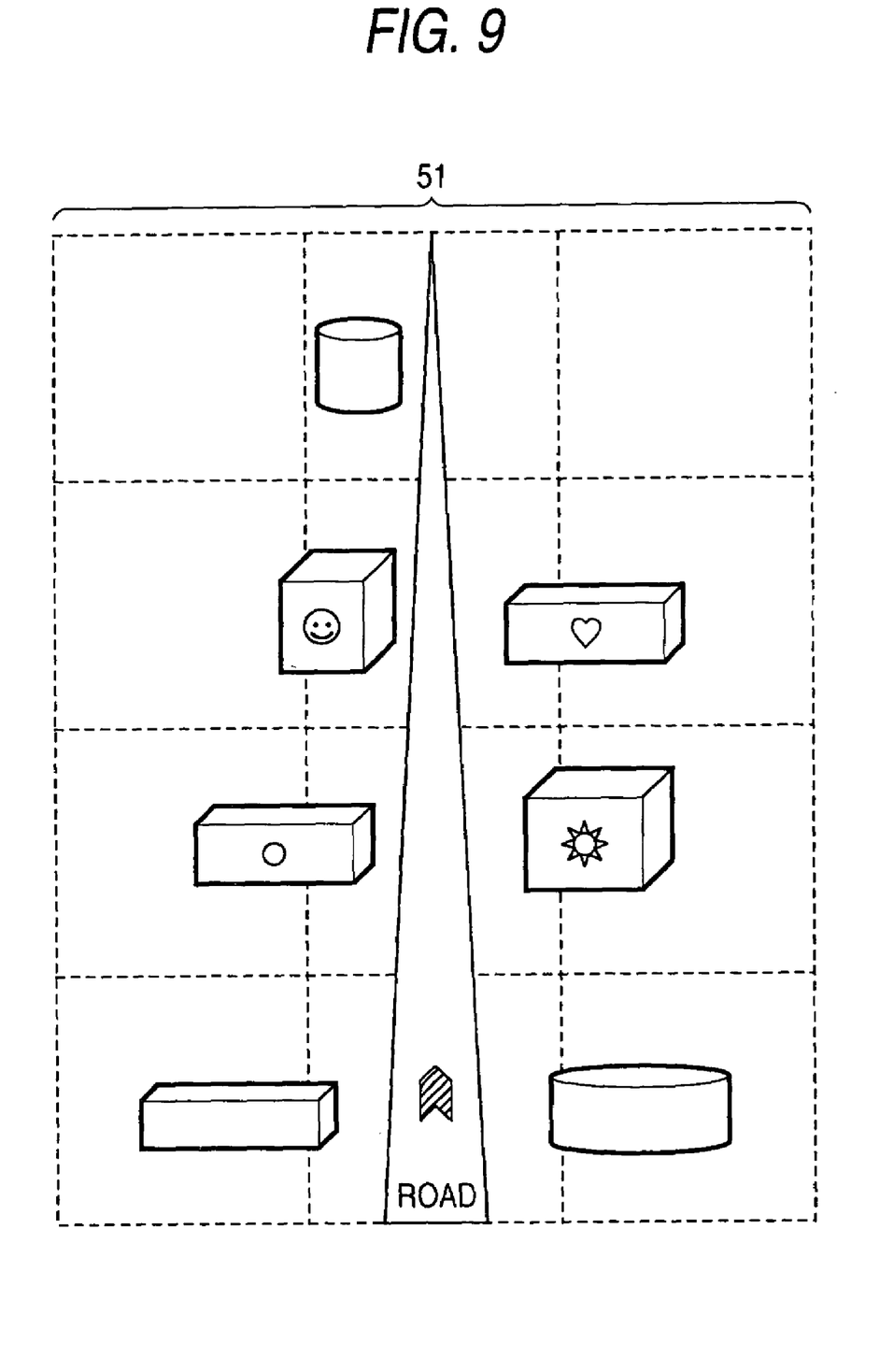
FIG. 9 is a diagram showing an example of an original image corresponding to map information which is read from a map information reading section.
Figure 10:
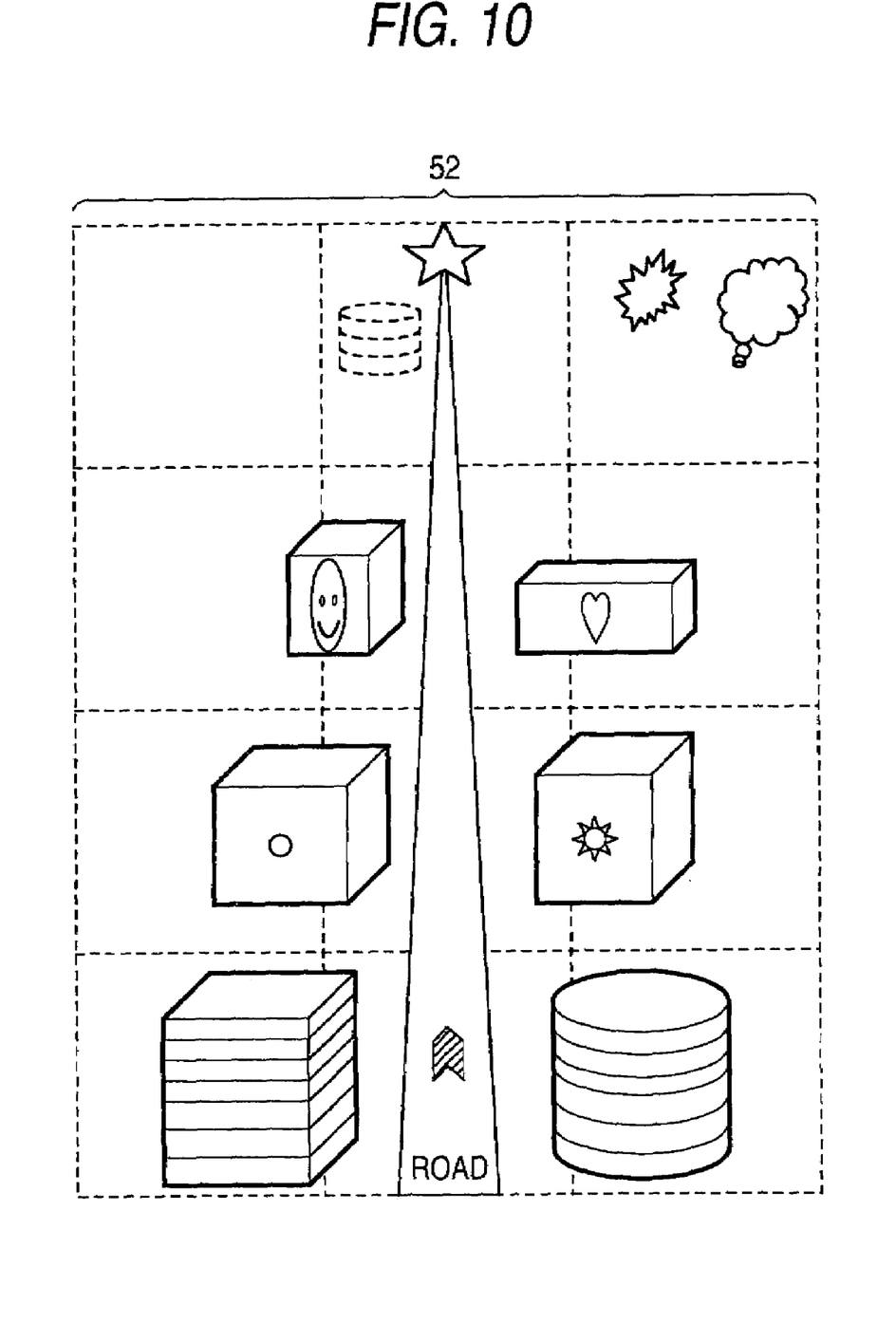
FIG. 10 is a diagram showing an example of an image which is obtained by processing the original image shown in FIG. 9 and corresponding to the map information which is read from the map information reading section, in an time interval at a certain timing.

FIG. 9 is a diagram showing an example of the original image corresponding to the map information, which is read from the map information reading section. FIG. 10 is a diagram showing an example of the image, which is obtained by processing the original image, which is shown in FIG. 9 and corresponds to the map information read from the map information reading section 11, by the map information processing section 13. The original image 51, which is shown in FIG. 9 and corresponds to the map information read from the map information reading section 11, is processed by the processing section 135 on the basis of the wide-range information indicated by the wide-range information code and the drawing method indicated by the drawing method code allocated to each of the divisions.

A result is outputted from the processing section 135 as the processed image 52 shown in FIG. 10.

As described above, according to the embodiment, the map information of the vehicle navigation apparatus is processed in accordance with the spectrum of the signal outputted from the sound source of the vehicle audio apparatus, so that the map information can be dynamically displayed in cooperation with the motion of a sound.

As described above, according to the first aspect of the invention, the form of an object contained in the map information is dynamically changed in cooperation with a spectrum of a signal of an input sound, whereby the display form of a display device can be provided with a novel function of cooperating with a sound. Therefore, the map drawing apparatus is provided with an entertaining element.

According to a second aspect of the invention, spectra of left and right channels of the input music are used, and the left and right channels are allocated to divisions of the map information, respectively, whereby motions of the object displayed on a screen can be expressed for each of the left and right channels of the input sound.

According to the third and fourth aspects of the invention, when motions of the object displayed on a screen are to be expressed for each of the left and right channels of the input sound, the left and right channels are allocated with using the road on which the own vehicle is travelling, as the center (third aspect), or, in the case where the screen is divided, allocation is performed in the unit of screen (fourth aspect), whereby motions of the object can be made different from each other with respect to a certain position on the screen. As a result, motions of the object are uniformalized for each of the regions, so that motions can be expressed without causing a visual sense of discomfort.

According to the fifth aspect of the invention, the spectra of high- and low-frequency ranges of the input sound are used, and the spectra are allocated to the divisions of the map information, whereby motions of the object displayed on the screen can be expressed for each of components of the input sound.

According to the six and seventh aspects of the invention, when motions of the object displayed on the screen are to he expressed for each of components of the input sound, the components of the sound are allocated in accordance with the distance from the road on which the own vehicle is travelling (sixth aspect), or the components of the sound are allocated for each of distant and close views of the displayed map (seventh aspect), whereby motions of the object can be made different from each other with respect to a certain position on the screen. As a result, motions of the object are uniformalized for each of the regions, so that motions can be expressed without causing a visual sense of discomfort.

According to the eighth aspect of the invention, even in an urban district where objects crowd, the display in the form of a wire frame image allows motions of individual objects to be clearly expressed.

According to the ninth aspect of the invention, since a graphic equalizer is displayed in a null display region of the background, the apparatus is provided with not only an entertaining element but also a practical function.

What is claimed is:

1. A map drawing apparatus comprising:
   a map information obtaining section which obtains map information from a map information database;
   a level extracting section which extracts a level of a spectrum over a predetermined frequency range from a signal of sound inputted from a sound source;
   an inputting section via which a user designates a predetermined item;
   a map information processing section which processes the obtained map information into map information in which a form of a predetermined object contained in the obtained map information dynamically changes in cooperation with the extracted spectrum level and with the item designated by the user; and
   a converting section which converts the processed map information into an image signal, which can be displayed on a display device,
   wherein the map information processing section allocates divisions of the map information to spectra of the input sound.

2. The map drawing apparatus according to claim 1, wherein the map information processing section allocates divisions of the map information to spectra of left and right channels of the input sound.

3. The map drawing apparatus according to claim 2,
   wherein the divisions of the map information are two display regions, which are separated across a road on which an own vehicle is travelling;
   wherein the left channel of the input sound is allocated to one of the display regions; and
   wherein the right channel of the input sound is allocated to the other of the display regions.

4. The map drawing apparatus according to claim 2,
   wherein the divisions of the map information are display regions obtained by dividing a display screen of the display device;
   wherein the display regions display a plurality of map information;
   wherein the left channel of the input sound is allocated to one of the display regions; and
   wherein the right channel of the input sound is allocated to the other of the display regions.

5. The map drawing apparatus according to claim 1, wherein the map information processing section allocates divisions of the map information to spectra of high-frequency range and low-frequency range of the input sound.

6. The map drawing apparatus according to claim 5,
   wherein the divisions of the map information are a region displaying a side close to a road on which an own vehicle is travelling and a region displaying a side remote from the road;
   wherein the high-frequency range of the input sound is allocated to one of the display regions; and
   wherein the low-frequency range of the input sound is allocated to the other of the display regions.

7. The map drawing apparatus according to claim 5,
   wherein the divisions of the map information are a region displaying a distant view of a displayed map and a region displaying a close view of the map;
   wherein the high-frequency range of the input sound is allocated to one of the display regions; and
   wherein the low-frequency range of the input sound is allocated to the other of the display regions.

8. The map drawing apparatus according to claim 1, wherein the object is displayed in a form of a wire frame image.

9. The map drawing apparatus according to claim 1, wherein a graphic equalizer is superimposedly displayed in a vacant display region of a background.

10. The map drawing apparatus according to claim 1, wherein the predetermined object is a structure.

11. The map drawing apparatus according to claim 1, wherein the form is at least one of height, color and shape.

12. The map drawing apparatus according to claim 1, where the sound is music.

* * * * *

UNITED STATES PATENT AND TRADEMARK OFFICE
CERTIFICATE OF CORRECTION

| | |
|---|---|
| PATENT NO. | : 7,098,906 B2 |
| APPLICATION NO. | : 10/254640 |
| DATED | : August 29, 2006 |
| INVENTOR(S) | : Yoshihito Ibe et al. |

Page 1 of 1

It is certified that error appears in the above-identified patent and that said Letters Patent is hereby corrected as shown below:

On The Title Page, Item (73) "Assignees" on the front page of the above-identified patent, add --Pioneer Design Corporation, Tokyo (JP)--.

Signed and Sealed this

Twenty-second Day of May, 2007

JON W. DUDAS
*Director of the United States Patent and Trademark Office*